United States Patent
Sharma

(10) Patent No.: US 11,775,584 B1
(45) Date of Patent: Oct. 3, 2023

(54) DYNAMICALLY SCALING QUERY PLAN OPERATIONS FOR QUERY PROCESSING

(71) Applicant: Amazon Technologies, Inc., Seattle, WA (US)

(72) Inventor: Atri Sharma, Bangalore (IN)

(73) Assignee: Amazon Technologies, Inc., Seattle, WA (US)

(*) Notice: Subject to any disclaimer, the term of this patent is extended or adjusted under 35 U.S.C. 154(b) by 1,087 days.

(21) Appl. No.: 16/396,339

(22) Filed: Apr. 26, 2019

(51) Int. Cl.
| | | |
|---|---|---|
| *G06F 16/00* | (2019.01) | |
| *G06F 16/903* | (2019.01) | |
| *G06F 16/2455* | (2019.01) | |
| *G06F 16/245* | (2019.01) | |

(52) U.S. Cl.
CPC ...... *G06F 16/90335* (2019.01); *G06F 16/2455* (2019.01); *G06F 16/24569* (2019.01)

(58) Field of Classification Search
CPC ............ G06F 16/2455; G06F 16/24569; G06F 16/90335
See application file for complete search history.

(56) References Cited

U.S. PATENT DOCUMENTS

| | | | |
|---|---|---|---|
| 7,984,043 B1 | 7/2011 | Waas | |
| 8,620,903 B2 | 12/2013 | Tatemura et al. | |
| 9,177,023 B2 | 11/2015 | Graefe et al. | |
| 11,055,352 B1* | 7/2021 | Beitchman et al. | G06F 16/14 |
| 2018/0314732 A1* | 11/2018 | Armbrust et al. | G06F 16/24542 |
| 2018/0373567 A1* | 12/2018 | Finlay et al. | G06F 9/5061 |

FOREIGN PATENT DOCUMENTS

CN 111694653 A * 9/2020

* cited by examiner

*Primary Examiner* — Alexander Khong
(74) *Attorney, Agent, or Firm* — S. Scott Foster; Kowert, Hood, Munyon, Rankin & Goetzel, P.C.

(57) ABSTRACT

Operations in a query plan generated for a query may be scaled when performed at a query engine. The performance of an operation in the query plan may be monitored to detect a scaling event. A performance distribution for the operation may be determined among a modified number of processing resources. The operation may then continue performing at the modified number of processing resources according to the determined performance distribution.

20 Claims, 9 Drawing Sheets

DYNAMICALLY SCALING QUERY PLAN OPERATIONS FOR QUERY PROCESSING

BACKGROUND

As recent revolution in technologies for dynamically sharing virtualizations of hardware resources, software, and information storage across networks has increased the reliability, scalability, and cost efficiency of computing. Virtualization allows applications to utilize computing resources, such as processor cycles and storage, at the time of demand, rather than allocating hardware in provisioning cycles. Some applications, however, were designed to operate upon hardware in the time before virtualization became viable or widely available. Therefore, techniques that allow applications to take advantage of the many benefits of virtualization are highly desirable.

Figure 1:
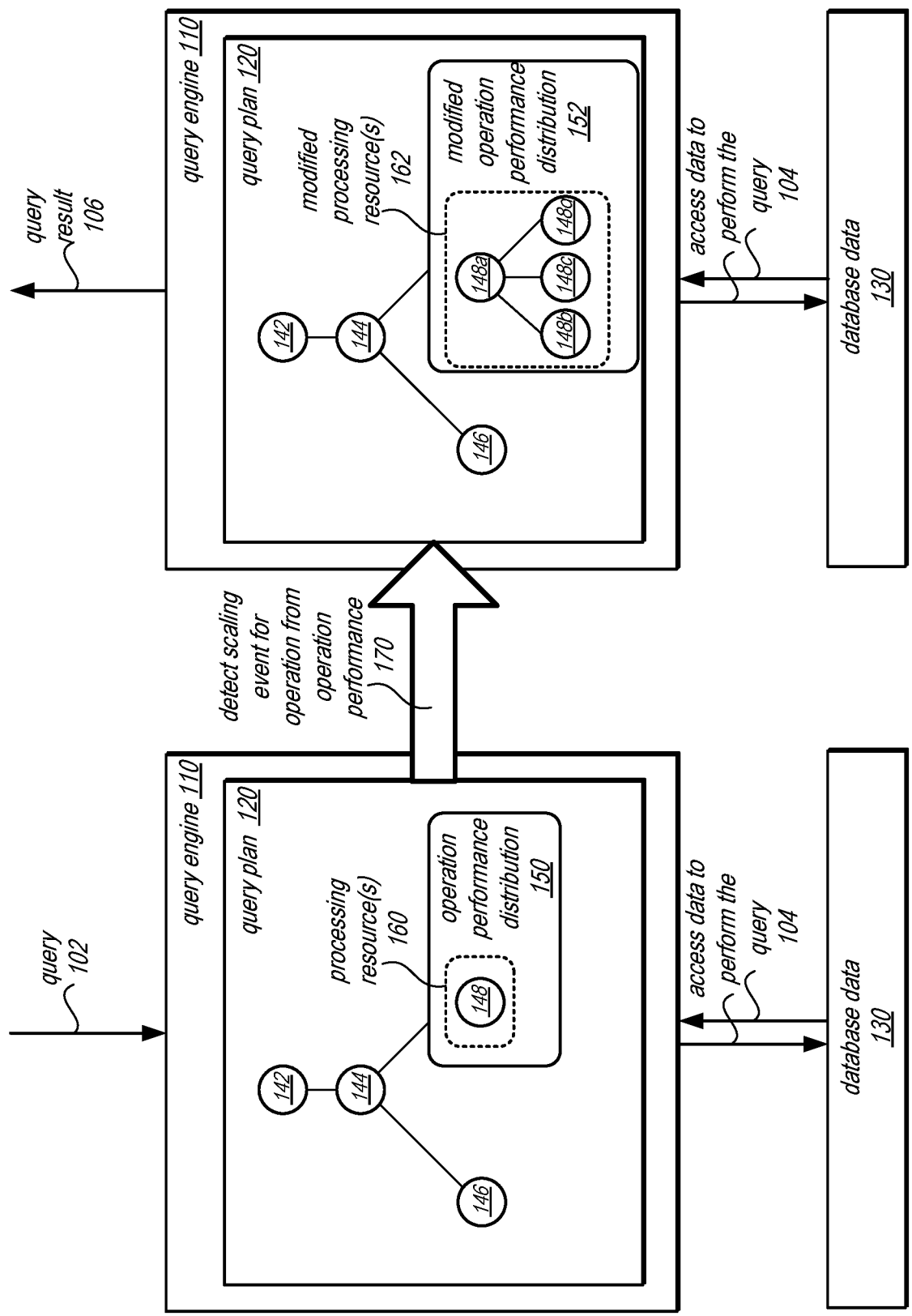
FIG. 1 is a logical block diagram illustrating dynamically scaling query plan operations for query processing, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of dynamically scaling query plan operations for query processing are described herein. Database query planning offers many opportunities to improve the performance of a database query, in various embodiments. For example, when a query to a database is received, the ordering of operations within a query plan, such as the order in which to apply a join operation between the results of data received from different database tables can significantly improve the performance of the query, providing a result in less time. Yet, query planning optimizations may not consider the flexibility to scale processing resources for a query that the advent of virtualization technologies may provide.

Dynamically scaling query plan operations for query processing, however, may enhance the improvements of query planning by scaling the performance of query plan operations as they are being executed. For instance, scaling events to change the distribution of operation performance may be based on the real-time performance of the query operations before they are complete and thus may complete queries faster than would a query engine that does not dynamically scale performance of query plan operations. In this way, an operation that is lagging in performance (e.g., is taking more time than other operations which may depend upon the operation) may be scaled to increase performance or an operation that is overutilizing data processing resources (e.g., to perform an operation that is dependent upon a slower operation which may not be scaled to perform faster) may be scaled to decrease performance.

FIG. 1 is a logical block diagram illustrating dynamically scaling query plan operations for query processing, according to some embodiments. Query engine 110 may perform requests to query a database, in various embodiments. Query engine 110 may be one of various types of database query engines for various types of databases, such as a relational database, a non-relational database, a distributed database, a cluster of servers or hosts that implement the query engine together to perform a query, specialized databases or database formats (e.g., time series database, log database, document database, among others), in some embodiments. Database data 130 may be tables, objects, records, files, documents, or other information that is stored in a variety of storage devices or systems, such as locally attached storage devices co-located with a sever that implements query engine 110, or a remote file system, data store, or other storage service which may be reached via a network connection and network requests to access database data.

As indicated at 102, a query may be received at query engine 110. Query engine 110 may perform various operations to interpret and/or prepare to perform the query, as discussed below with regard to FIG. 3. A plan to perform the query may be generated that includes various operations, in some embodiments. For example, query plan operations may be operators in a physical query plan, such as various scan operations, join operations, aggregation operations, grouping operations, sorting operations, filtering operations, shuffling operations, among other operations. Consider query plan 120 that includes operations 142, 144, 146, and 148 to perform query 102. As part of performing query plan 120, query engine 110 may access 104 database data 130 (e.g., to write, update, modify, scan, filter, search, or otherwise use data to perform query 102).

Query engine 110 may monitor the performance of individual operations of query plan 120. For example, operation 148 may be performed using one or more processing resource(s) 160. Processing resource(s) 160 may include, one or more processes implemented on one or more processors at a host system for query engine 110 (as discussed below with regard to FIG. 4), various different virtualized resources (e.g., virtual machines or virtual operating system containers, as discussed below with regard to FIG. 5), and/or processing resources external to query engine 110 (e.g., a separate computation system or service as discussed below with regard to FIG. 6).

Query engine 110 may track the performance of individual operations in query plan 120 in order to monitor for and detect scaling events, in some embodiments. For example, query engine 110 may monitor performance measures, features, metrics or other indications, such as the amount of time elapsed since the operation began or an amount of processor, network, I/O, or other resource utilized by the operation. Query engine 120 may detect scaling events to increase or decrease the performance of an operation, in various embodiments, without modifying the performance of other operations in query plan 120. For example, operation 144, which may be dependent upon the output of operation 148 to perform, may be performed as if no scaling event were detected for operation 148 (e.g., performed without a change in input to or output from the scaled operation so that the expectations of other operations like operation 144 are not changed). In this way, scaling of operations may be performed individually and independently from other operations in a query plan, as not all operations may be scalable in some embodiments (as discussed below with regard to FIG. 8).

Various criteria, thresholds, conditions, or other features of operation performance may be evaluated to detect a scaling event, in some embodiments. For example, a time elapsed threshold may be evaluated, in some embodiments, so that a scaling event may be detected if the time elapsed for an operation exceeds the threshold. In some embodiments, other considerations, such as they type of operation (e.g., a scan operation, an aggregation operation, etc.) may indicate what criteria are to be applied.

Once a scaling event is detected, as indicated at 170, a new or modified performance distribution for operation 148 may be determined according to modified processing resource(s) 162, in some embodiments. For example, the scaling event may increase the number of operation "instances" from operation 148, to operation 148*a*, 148*b*, 148*c*, and 148*d* which may be executed separately on different processing resource(s) in order to increase the speed or other performance feature of operation 148. Although FIG. 1 depicts an event to increase performance, other scaling events to decrease the number of processing resources may be detected in other embodiments, including in scenarios where a previous scaling event for the same operation increased the processing resources.

Performance of query plan 120 may continue at query engine 110 so that the modified performance distribution of operation 148 among modified processing resource(s) 162 may contribute to the performance of query 102 in order to provide a query result. In some embodiments, no other operation may be scaled in a query plan, or one, some, or all other operations in query plan 120 (e.g., operations 142, 144, and 146) may be scaled according to a detected scaling event.

Please note that the previous description of dynamically scaling query plan operations for query processing is a logical illustration and thus is not to be construed as limiting as to the implementation of a query engine, query plan, database, processing resource, or scaling event.

This specification begins with a general description of a provider network that implements multiple different services, including database services, which may implement dynamically scaling query plan operations for query processing, according to some embodiments. Then various examples, including different components/modules, or arrangements of components/module that may be employed as part of implementing the database service and processing resources are discussed. A number of different methods and techniques to implement is dynamically scaling query plan operations for query processing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
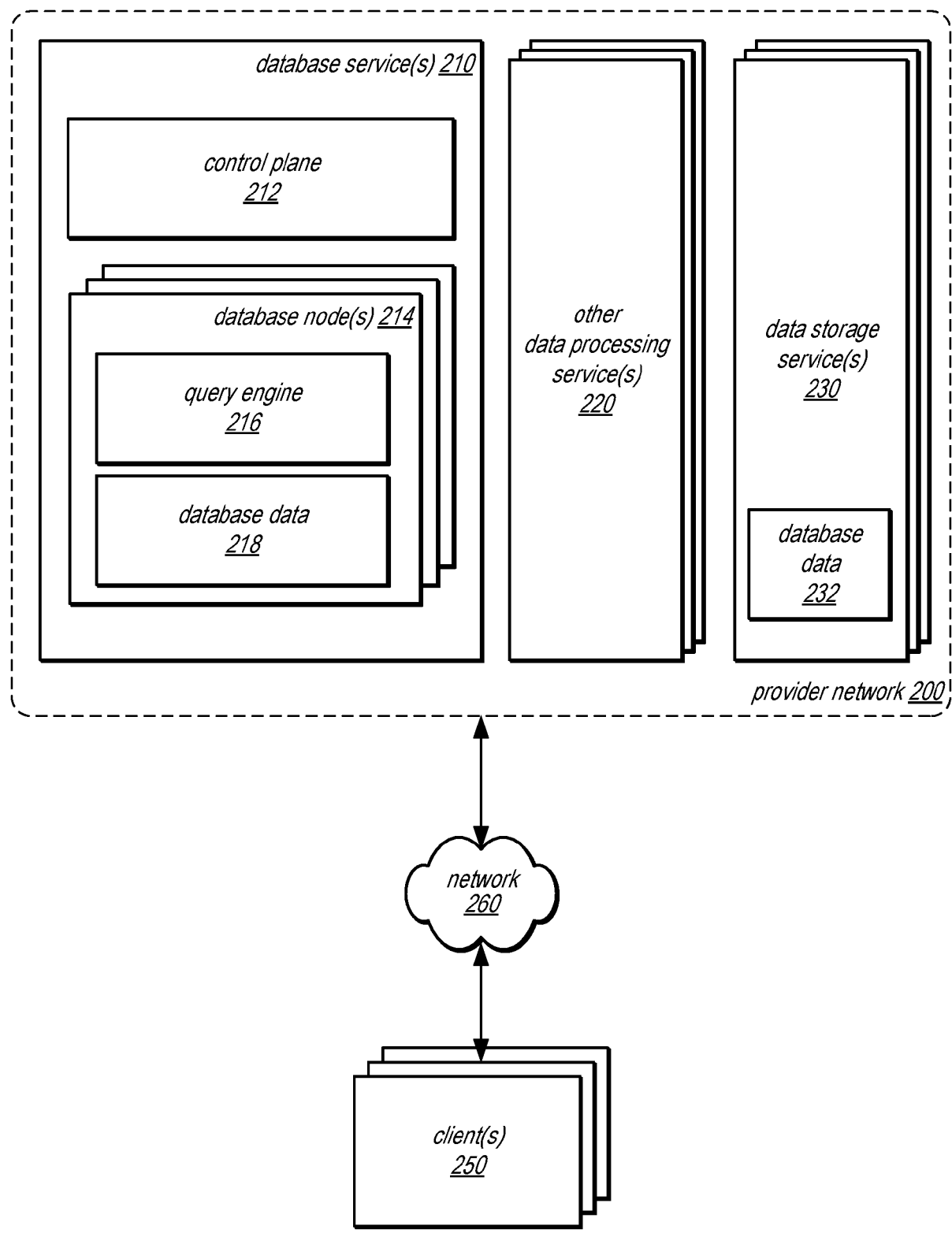
FIG. 2 is a logical block diagram illustrating a provider network offering database services that implement dynamically scaling query plan operations for query processing, according to some embodiments.

FIG. 2 is a logical block diagram illustrating a provider network offering database services that implement dynamically scaling query plan operations for query processing, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In some embodiments, provider network 200 may implement various computing resources or services, such as database service(s) 210, (e.g., a map reduce service, a data warehouse service, relational database services, non-relational database services (e.g., NoSQL) and other database services), other data processing service 220 (e.g., virtual compute services or event-driven compute services), and data storage services 230 (e.g., object storage services or block-based storage services that may implement a centralized data store for various types of data), and/or any other type of network based services (which may various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below (e.g., a host server that implements one (or more) nodes of a service). In various embodiments, the functionality of a given system or service component (e.g., a component of database service(s) 210, other data processing service(s) 220, or data storage service(s) 230) may be implemented by a particular node or may be distributed across several nodes. In some embodiments, a given node may implement the functionality of more than one service system component (e.g., more than one data store component).

Database services 210 may be various types of data processing services that process queries to a database. Database service(s) 210 may, in some embodiments, perform general or specialized data processing functions (e.g., anomaly detection, machine learning, data mining, big data querying, or any other type of data processing operation). For example, in at least some embodiments, database service(s) 210 may include a map reduce service that creates clusters of processing nodes that implement map reduce functionality over data stored in the map reduce cluster as well as data stored in one of data storage services 230. In another example, database service(s) 210 may include various types of database services both relational and non-relational for storing, querying, and updating data. Such services may be enterprise-class database systems that are highly scalable and extensible. Queries may be directed to a database in database service(s) 210 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Database service(s) 210 may implement a control plane 212 to provide a separate administrative interface for operating database node(s) 214 as well as a service Control plane 212 may provide visibility and control to system administrators, as well as various automated features, in some embodiments. In one embodiment, control plane 212 may also include an admin console, through which system administrators may interact with the data storage service (and/or the underlying system). In one embodiment, the admin console may be the primary point of visibility and control for the data storage service (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 212 may provide an interface or access to information stored about one or more detected control plane events, in one embodiment.

Control plane 212 may be configured to direct the performance of different types of control plane operations among the nodes, systems, or devices implementing database service(s) 210, in one embodiment. For instance, control plane 212 may be configured to communicate with database nodes 214 to initiate the performance of various control plane operations, such as moves, splits, update tables, delete tables, create indexes, etc.... In one embodiment, control plane 212 may be configured to update a task registry (or some other table or data structure) with the status, state, or performance information of the control plane operations currently being performed. Control plane 212 may detect, direct, or otherwise instigate operations to replace, repair, or otherwise handle various failure scenarios among database node(s) 214.

Database nodes 214 may implement a query engine 216, in one embodiment. Query engine 216 may create, update, define, query, and/or otherwise administer databases, in one embodiment. For instance, query engine 216 may maintain a database according to a database model (e.g., a relational or non-relational database model). In one embodiment, query engine 216 may allow a client to manage data definitions (e.g., Data Definition Language (DDL) requests to describe column definitions, requests to add item attributes, etc.). In one embodiment, query engine 216 may handle queries to access the data (e.g., to insert, modify, add, or delete data as well as requests to query for data by generating query execution plans to determine which partitions of a database may need to be evaluated or searched in order to service the query). In one embodiment, query engine 216 may also perform other management functions, such as enforcing access controls or permissions, concurrency control, or recovery operations.

In some embodiments, query engine 216 may implement a storage engine to access either internal storage for database data 218 and/or external storage (e.g., database data 232 stored in data storage service(s) 230). The storage engine may perform requests on behalf of query engine 216 to create, read, update and delete (CRUD) data in a database data 218, in one embodiment. The storage engine may implement buffers, caches, or other storage components to reduce the number of times storage is accessed, in one embodiment.

In one embodiment, database service 210 may provide functionality for creating, accessing, and/or managing tables or other database structures processed at nodes within a single-tenant environment than those that provide functionality for creating, accessing, and/or managing tables maintained in database nodes 214 within a multi-tenant environment. In another embodiment, functionality to support both multi-tenant and single-tenant environments may be included in any or all of the components illustrated in FIG. 2.

Other data processing service(s) 220 may implement other types of data processing services which may be used to scale the performance of individual operations. For example, other data processing service(s) 220 may include virtualization services for computing resources, such as service that supports the implementation of virtual machines. These virtual machines may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor) or machine image. A number of different types of computing devices may be used singly or in combination to implement compute instances, in different embodiments, including general purpose or special purpose computer servers, storage devices, network devices and the like. Similarly, virtualization services may include support for operating system virtualization. Servers may implement an operating system virtualization layer or engine in order to provide virtualized operating system environments for different software containers. Virtual machines or software containers may, in some embodiments, may perform individual query operations (e.g., by implementing a portion of a query engine that executes query operation plans).

Figure 6:
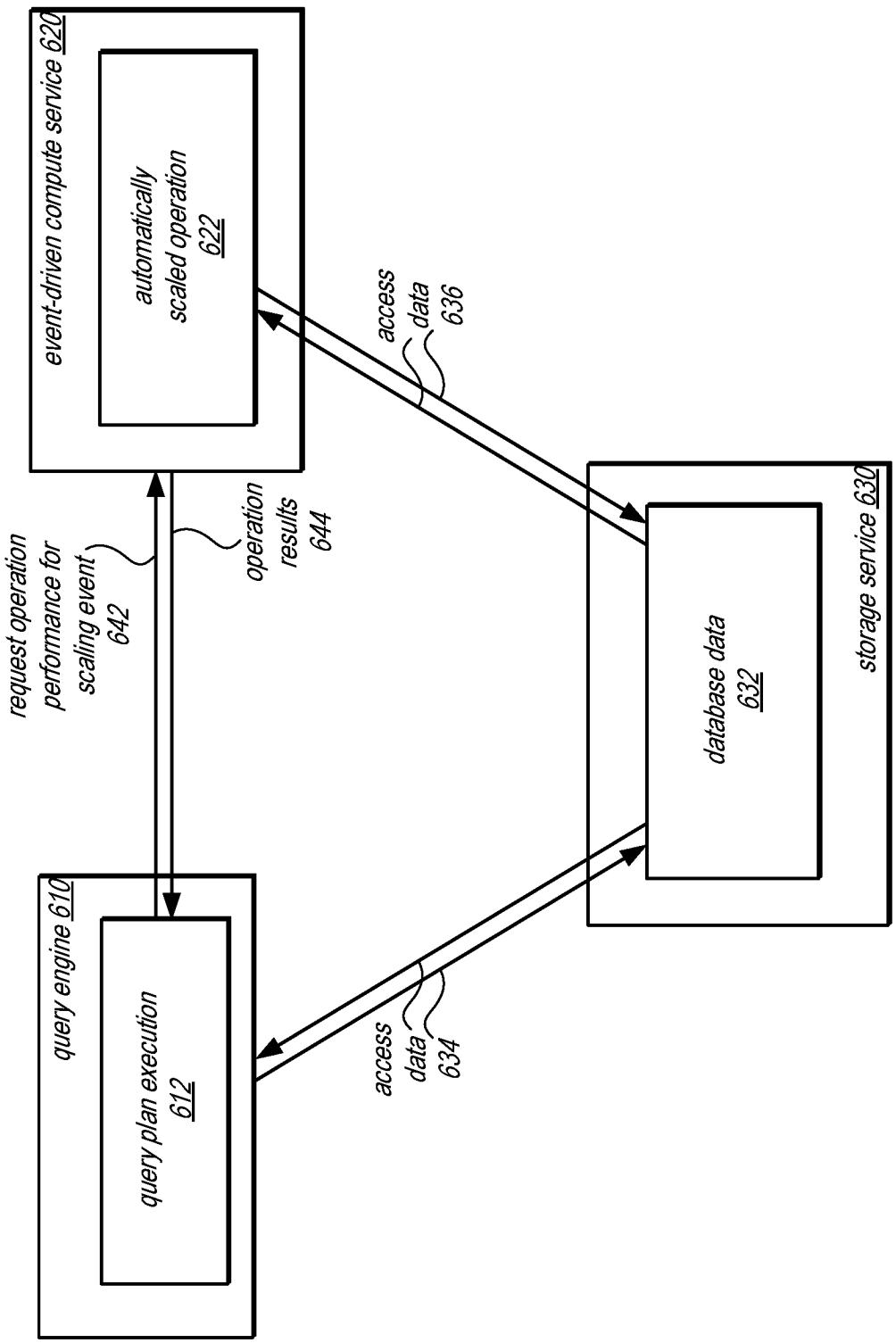
FIG. 6 is a logical block diagram illustrating an event driven compute service for a scaling event, according to some embodiments.

Other data processing service(s) 220 may implement an event driven computing service, as discussed below with regard to FIG. 6. For example, an event driven compute service 210 may maintain a pool of pre-initialized virtual machine instances that are ready for use as soon as a request is received to execute a function or other program code, in various embodiments. The event driven compute service may maintain a pool of virtual machine instances that have one or more software components (e.g., operating systems, language runtimes, libraries, etc.) loaded thereon. The functions or other program codes can be executed in isolated containers that are created on the virtual machine instances, in some embodiments, or separate physical servers, hosts, or computing devices. Since the virtual machine instances in the pool have already been booted and loaded with particular operating systems and language runtimes by the time the requests are received, a delay associated with finding compute capacity that can handle the requests (e.g., by executing the functions or other program codes in one or more containers created on the virtual machine instances) may be significantly reduced, in some embodiments.

In some embodiments, the event-driven compute service may facilitate transportation or communication of event messages generated in a first programmatic environment (e.g., at another service, such as database service 210 as discussed below with regard to FIG. 6). To further facilitate propagation and transportation of a triggered event from the first programmatic environment to the event driven compute service, event messages may be generated to include information descriptive of the triggered event, a user associated with a request to execute functions or other program codes in response to the triggered event, and programmatic information to enable the event driven compute service to convert the event message into a request for further processing by event driven compute service. The event message and/or programmatic information contained therein may be structured according to a schema, a code model, or an application programming interface ("API"), console, command-line or graphical user interface or any other interface to facilitate both creation/generation of the event message at the auxiliary service and conversion/processing of the event message at event driven compute service, in some embodiments.

An event driven compute service may operate as a "serverless" or fully managed computational service, implementing features such as automatic rate matching and scaling between events being triggered on an auxiliary service (e.g., a scaling event for a query plan operation) and the corresponding execution of functions or other program codes on various virtual machine instances in the event driven computing service, in some embodiments. Thus, the event driven compute service may be capable of responding to events on-demand, whether the events are triggered infrequently (e.g., once per day) or on a larger scale (e.g., hundreds or thousands per second), in some embodiments.

Functions or program code executed by the event driven compute service may be any program code (e.g., a program, routine, subroutine, thread, etc.) written in a program language or programming paradigm (e.g., automatically generated code based on user-specified steps, operations, or other representations of functionality), in some embodiments. Such functions or other program codes may be executed to achieve a specific task, in some embodiments—such query plan operation, such as the query plan operations for which query engines processing queries may generate, perform, and detect a scaling event. The functions or other program codes may be written in various programming languages or scripts, such as JavaScript (node.js), Java, Python, and/or Ruby. The request and/or corresponding event message may include an identifier of the event used to identify the function (and location thereof), and one or more arguments/parameters to be used for executing the function or program code, in one embodiment. For example, the function or other program code may be provided along with the request to execute the function or program code in response to the occurrence of one or more events, in one embodiment. In another example, the request may identify a previously uploaded function or program code (e.g., using an API for uploading the code as discussed below with regard to FIG. 6) by its name or its unique ID and one or more triggering conditions for executing the function, in one embodiment. In yet another example, the function may be included in the request as well as uploaded in a separate location (e.g., a storage service or a storage system internal to the event driven compute service) prior to the request is received by the event-driven compute service, in some embodiments.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds of object or file data stores for putting, updating, and getting data objects or files. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as audio files and web site log files. Data storage service(s) 230 may be accessed via programmatic interfaces (e.g., APIs) or graphical user interfaces. For example, other data processing services 220 may access database data 232 stored in data storage services via the programmatic interfaces (as discussed below with regard to FIG. 6).

Generally speaking, clients 250 may encompass any type of client that can submit network-based requests to provider network 200 via network 260, including requests for storage services (e.g., a request to query a database service 210). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 210, other data processing service(s) 220, or storage resources in data storage service(s) 230 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of data storage service(s) 230 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 230 may be coordinated by client 250 and the operating system or file system on behalf of applications executing within the operating system environment. Similarly, a client 250 may be an analytics application that relies upon database service(s) 210 to execute various queries for data already ingested or stored in the data processing service or data stored in a data lake hosted in data storage service(s) 230. In some embodiments, clients of database service(s) 210, other data processing service(s) 220, and/or data storage service(s) 230 may be implemented within provider network 200 (e.g., an application hosted on a virtual computing resource that utilizes a database service 210 to perform database queries) to implement various application features or functions and thus various features of client(s) 250 discussed above may be applicable to such internal clients as well.

Clients 250 may convey network-based services requests (e.g., access requests to read or write data may be directed to data in data storage service(s) 230, operations, tasks, or jobs, being performed as part of data processing service(s) 220, or to interact with data catalog service 210) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
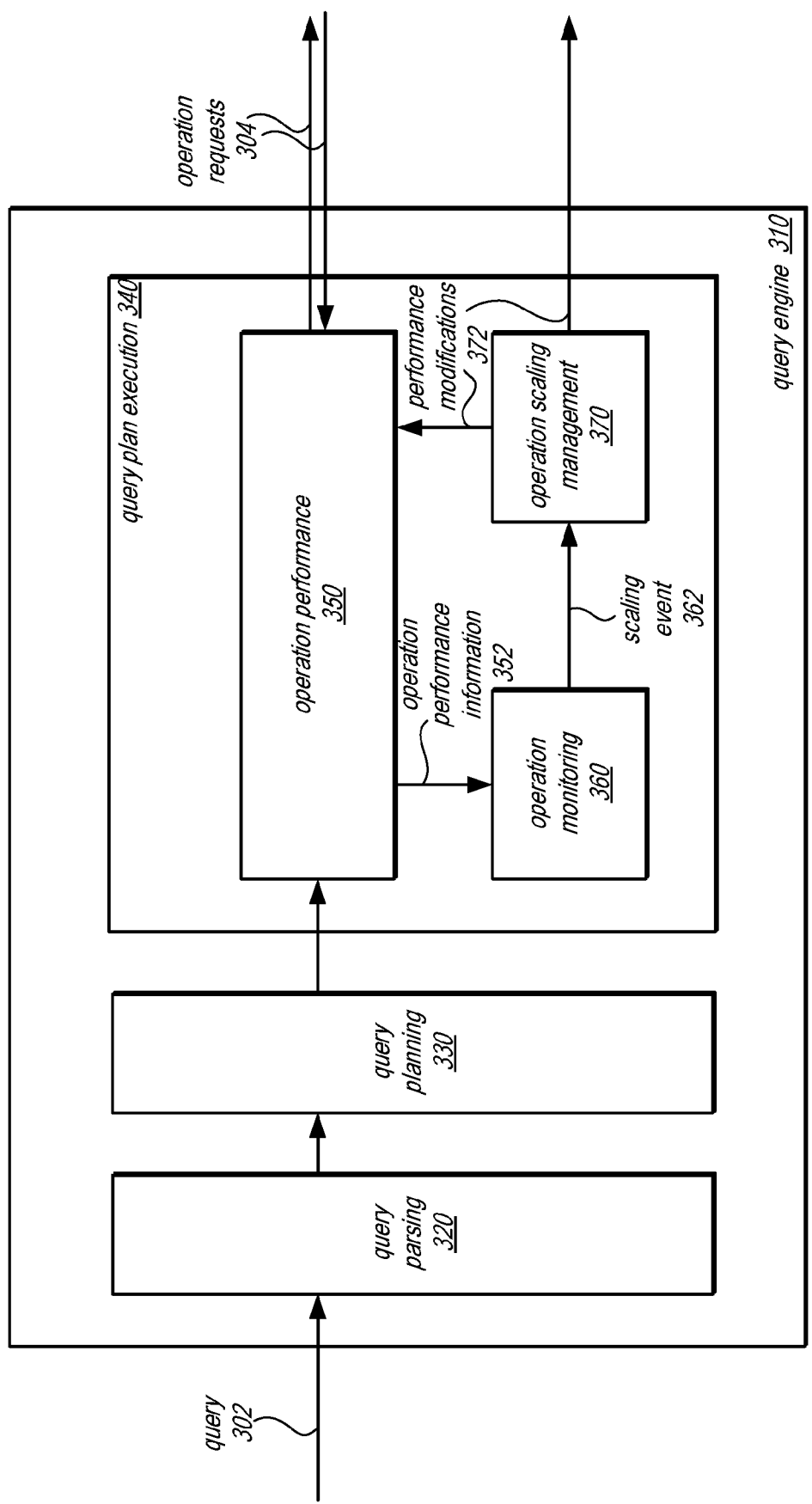
FIG. 3 is a logical block diagram of a query engine that implements dynamically scaling query plan operations for query processing, according to some embodiments.

Different types of query engines may be implemented in different embodiments. For example, a query engine may be implemented in a cluster or distributed query processing environment. A leader-worker paradigm for the cluster may be implemented, whereby a leader database node receives and directs performance of the query amongst the other worker database nodes. A leaderless paradigm where each database node may be responsible for handling queries (and coordinating with other database nodes in the cluster) may be implemented, in some embodiments. Instead of distributed query engines that perform queries, a query engine may be implemented as a stand-alone query engine that operates on a single database node 214, in some embodiments. FIG. 3 is a logical block diagram of a query engine that implements dynamically scaling query plan operations for query processing, according to some embodiments. The techniques discussed below with regard to a query engine may be applied in both distributed or stand-alone types of query engines.

Query engine 310 may receive a query 302. Query engine 310 may implement query parsing 320, in various embodiments, to parse query 302. For example, query parsing 320 may receive a query statement, such as a SQL statement, and determine the various requested operations to perform as a result of the query. For example, query parsing 320 may generate a query or syntax tree for a given query input string to separate out the various query clauses, fields, predicates, conditions, commands, or other query information for planning and optimization.

Query engine 310 may implement query planning 330, in various embodiments, to generate a plan to perform a query. Query planning 330 may include both logical and physical query plan generation, in some embodiments. Query planning 330 may perform various operations to generate a query execution plan for the parsed query (e.g., a tree of plan operation nodes, which may be later used to generate query execution code in some embodiments). For example, query planning 330 may perform an optimization technique to select one of various combinations or orderings of plan operator nodes in a tree produces a least costly plan to execute. In at least some embodiments, query planning 330 may obtain or estimate statistics for remote tables which may include nested data, including statistics such as the cardinality of top-level collection, equi-depth histograms and most common values for each top level attribute, average cardinality (e.g., fanout) for nested collections, histograms, most common values for inner attributes expressed as if the nested collection was unfolded, in some embodiments.

Query engine 310 may implement query plan execution 340 to perform the query plan, in some embodiments. Query plan execution 340 may perform individual operations 350, including various operation requests 304 (e.g., to access database data). Operation monitoring 360 may receive operation performance information 352 (e.g., performance measures, features, metrics or other indications such as the amount of time elapsed since the operation began or an amount of processor, network, I/O, or other resource utilized by the operation) while operation performance 350 is ongoing, in some embodiments. Operation monitoring 360 may evaluate operation performance information with respect to scaling event detection criteria, as discussed below with regard to FIG. 7, and provide an indication of a scaling event 362 when detected to operation scaling management 370. Query plan execution 340 may monitor the performance of individual operations independently and performing scaling independently for individual operations, in some embodiments.

Operation scaling management 370 may determine a performance distribution among modified resources according to the scaling event, as discussed below with regard to FIGS.

For example, the number of processing resources may be increased or decreased. Performance modifications 372 may be performed in various ways, as discussed below with regard to FIGS. 4 - 6. An application programming interface (API) request may be implemented, in various embodiments, which can be invoked to modify and/or redistribute performance of an operation according to various parameters (e.g., number of processing resources, responsibilities of different processing resources, etc.) Some performance modifications 372 may alter operation performance locally at query engine 310, while other modifications 372 may utilize external resources.

Figure 4:
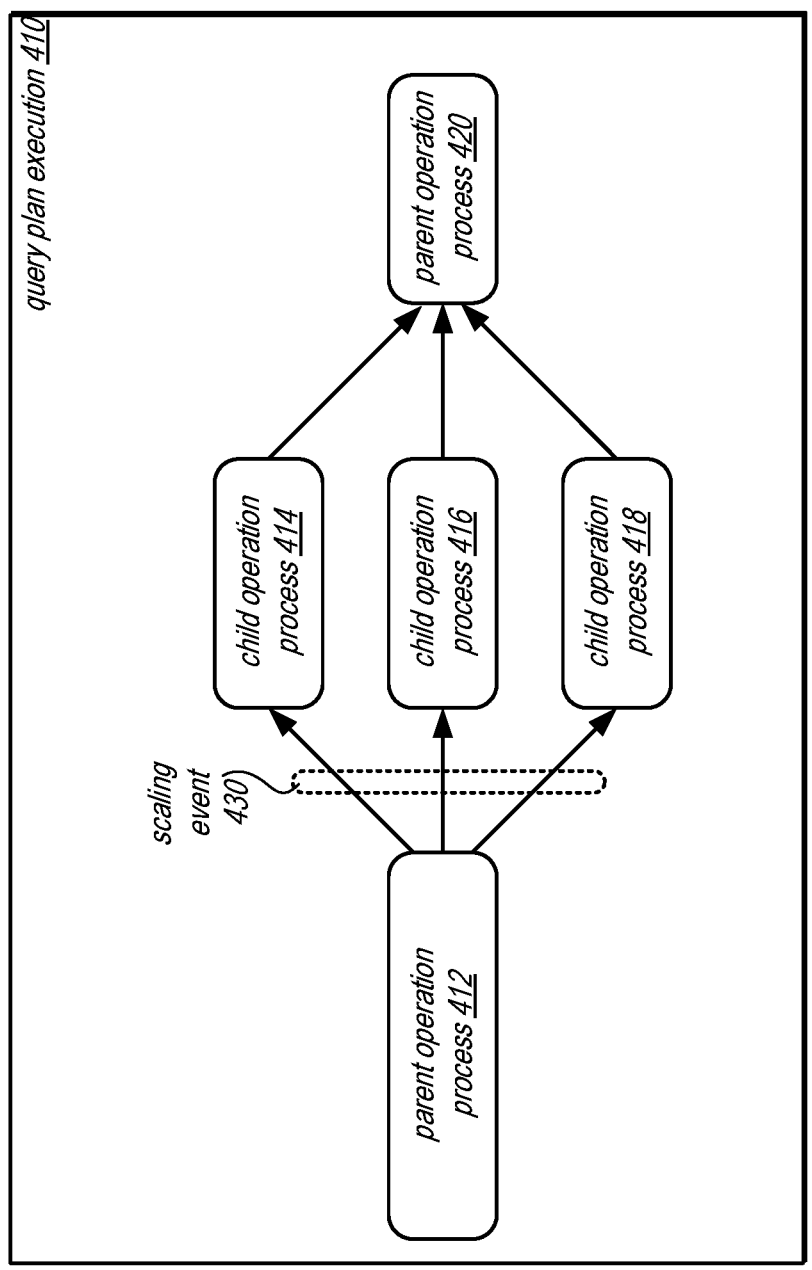
FIG. 4 is a logical block diagram illustrating child operation processes for a scaling event, according to some embodiments.

For example, FIG. 4 is a logical block diagram illustrating child operation processes for a scaling event, according to some embodiments. Query plan execution 410 may utilize operation process manipulations for a parent operation process 412. When scaling event 430 is detected, one or multiple copies of the process may be created (e.g., using a system call feature like "fork" for the Unix operating system). These child operation processes, such as child operation processes 414, 416, and 418, may each perform a copy of different (e.g., non-overlapping) portions of the parent operation process 412 before returning to parent operation process 420 (which may merge the operation results). For example, for a scan operation, each child operation process may scan a different range of database data (e.g., different portions of a table).

Figure 5:
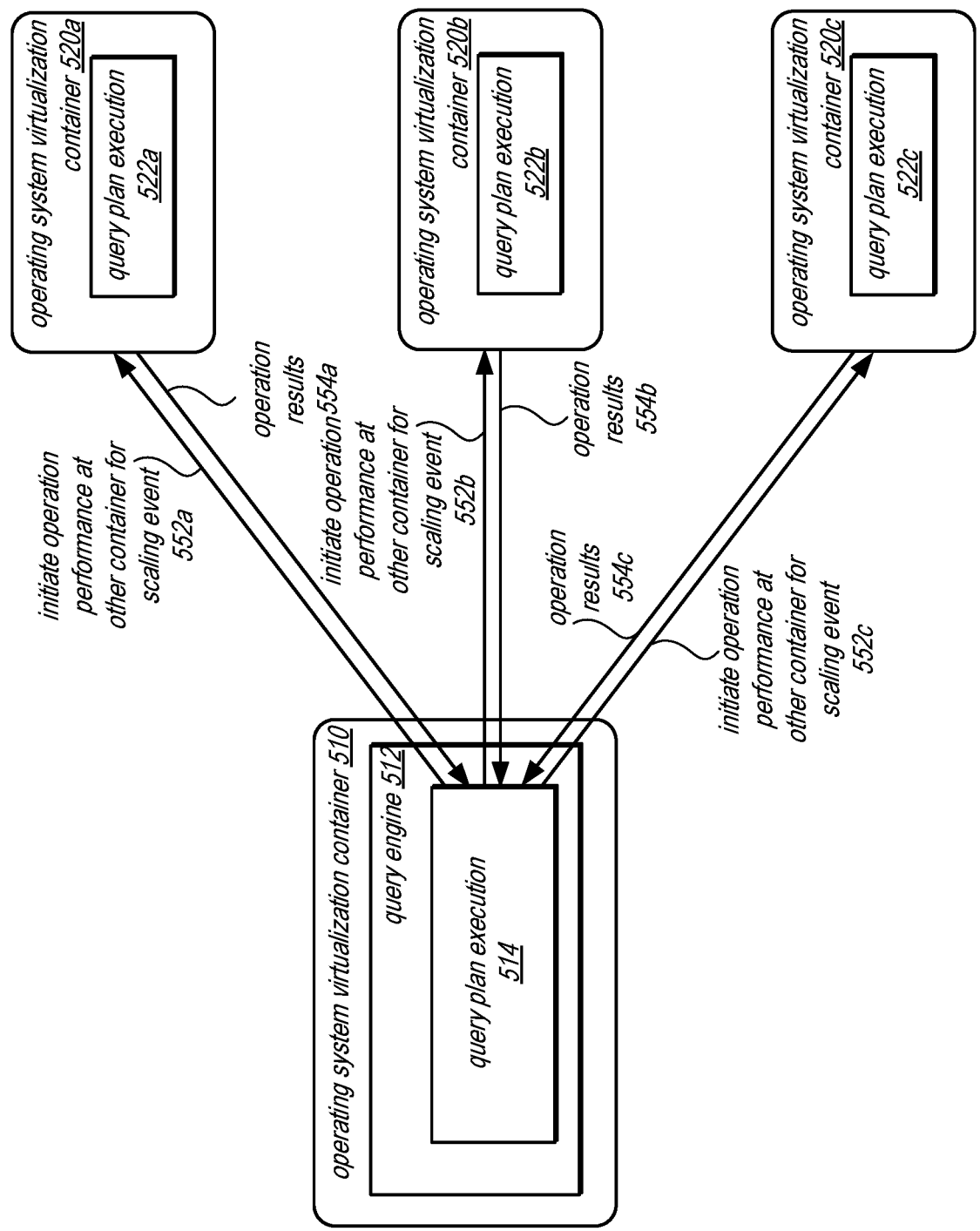
FIG. 5 is a logical block diagram illustrating operating system virtualization containers for a scaling event, according to some embodiments.

In another example of scaling resources, virtualization technologies may be utilized to respond to scaling events for an operation. FIG. 5 is a logical block diagram illustrating operating system virtualization containers for a scaling event, according to some embodiments. Query engine 512 may be implemented in an operating system virtualization container 510 (as discussed above with regard to FIG. 2). Query plan execution 514 may perform an operation for which a scaling event is detected. To scale performance of the operation, a query plan execution application (or portion thereof), such as query plan execution 522a, 522b, and 522c, hosted in other containers, such as containers 520a, 520b, and 520c, may be requested to initiate performance at the other container for the operation according to the scaling event, as indicated at 552a, 552b, and 552c. The initiation request 552 may include the operator (or a portion of the operator determined by the query plan execution 514) and a location of database data (if needed) to perform the operation. As containers 520 may be implemented at a same host as container 510, local database data may be accessible to the containers. Alternatively, remotely accessible database data (e.g., in a data storage service 230) may be used to perform the operation.

Query plan execution 522 at other containers 520 may return operation results, as indicated at 554a, 554b, and 554c, to query plan execution 514. Query plan execution 514 may merge or otherwise combine the operation results to obtain a complete operation result in order to proceed with performing another portion of the query plan. In some embodiments, containers 520 may not be released after the operation completes but be held in reserve in the event another query plan operation may utilize the containers for a scaling event. In other embodiments, containers 520 may be released (e.g., deallocated, terminated, etc.).

In another example of scaling resources, external processing resources may be utilized to respond to scaling events for an operation. FIG. 6 is a logical block diagram illustrating an event driven compute service for a scaling event, according to some embodiments. As discussed above with regard to FIG. 2, an event-driven compute service 620 may be implemented as part of a provider network 200. Events to perform functions or other code to perform different operations may be provided to event-driven compute service 620 so that event triggers to perform different query plan operations may be sent as requests to perform the different operations.

For instance, query engine 610 may perform a query plan at query plan execution 612 (e.g., by accessing database data 632 in storage service 630). A scaling event may be detected for an operation by query plan execution 612. Query plan execution 612 may submit a request 642 for performance of the operation for the scaling event to event drive compute service 620. Event-driven compute service 620 may cause a stored function or other code corresponding to the operation to be performed. The operation may be automatically scaled 552b, in some embodiments, as event-driven compute service 620 may automatically adjust the number of computing resources to perform the operation. Automatically scaled operation 622 may also access 636 database data 632 and return operation results 644 to query plan execution 612, which may merge or otherwise combine the operation results to obtain a complete operation result in order to proceed with performing another portion of the query plan.

Figure 7:
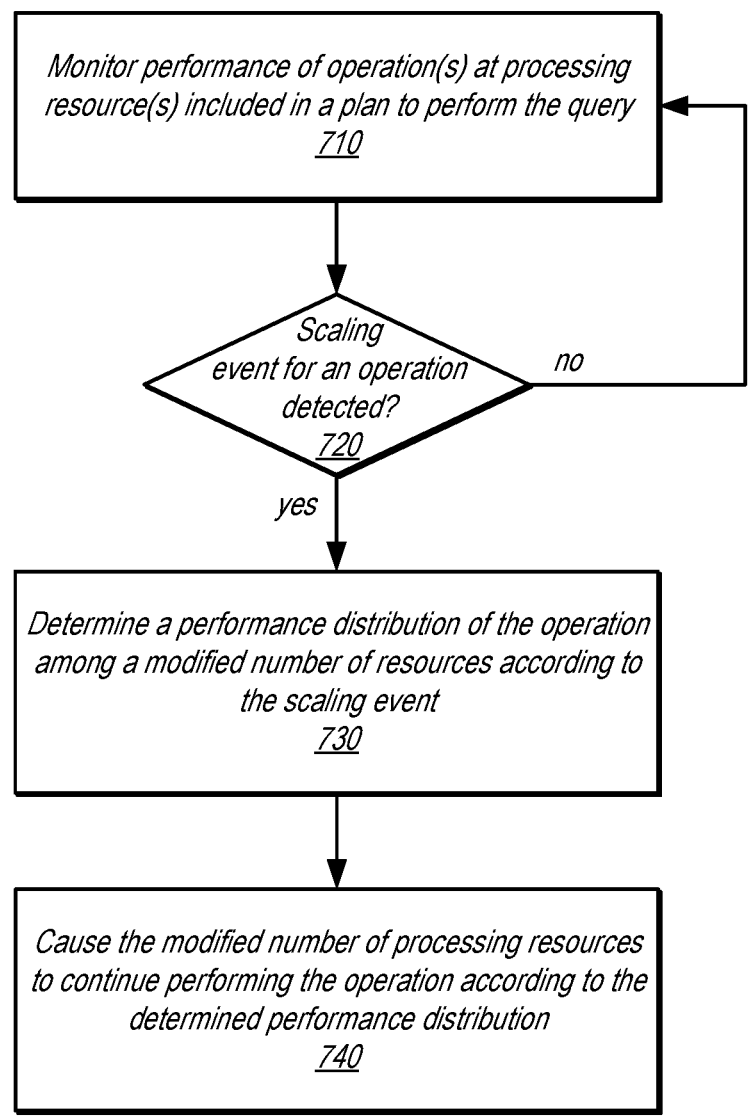
FIG. 7 is a high-level flowchart illustrating methods and techniques to implement dynamically scaling query plan operations for query processing, according to some embodiments.

Although FIGS. 2 - 6 have been described and illustrated in the context of a provider network implementing different database services, the various components illustrated and described in FIGS. 2 - 6 may be easily applied to other data processing systems that utilize query engines to perform queries to database data, such as private database systems, including individual database servers. As such, FIGS. 2 - 6 are not intended to be limiting as to other embodiments of dynamically scaling query plan operations for query processing. FIG. 7 is a high-level flowchart illustrating methods and techniques to implement dynamically scaling query plan operations for query processing, according to some embodiments.

Various different systems and devices may implement the various methods and techniques described below, either singly or working together. For example, a query engine may implement some or all of the various methods (e.g., by implementing the different processing resources used when scaling a query plan operation). Different combinations of services implemented in a provider network (or different provider networks operated by different entities) may implement some or all of the methods (e.g., a database system in a private network, an event-driven compute service in a provider network, and a data set stored in a service of the provider network). Alternatively, various other combinations of different systems and devices located within or without provider networks may implement the below techniques. Therefore, the above examples and or any other systems or devices referenced as performing the illustrated method, are not intended to be limiting as to other different components, modules, systems, or devices.

A query may be a received at a query engine (e.g., a database engine, system or platform, such as a data warehouse or other data processing cluster (e.g., other types of database systems, including relational and non-relational database systems), in some embodiments. The query may be specified in according to various formats, languages (e.g., Structured Query Language (SQL), protocols, or interfaces (e.g., query statements or predicates included in Application Programming Interface (API) message or request), in some embodiments. In order to perform the query, a query plan may be generated according to various query plan optimization techniques. For example, the operations to perform the query plan may be identified and arranged in various orders (e.g., different join orders). Each of the plans may then have a cost or value assigned to the plan so that the plan with the lowest cost may be selected in order to provide the best performance for the query. Performance of the query plan may then begin.

As indicated at 710, performance of operation(s) at a processing resource(s) included in a plan to perform the query may be monitored, in some embodiments. For example, operation performance state may be tracked or updated in a monitoring data structure (e.g., a table). At periodic (or aperiodic) intervals, performance information updates may be recorded or otherwise stored in the performance state. In some embodiments, performance information of a query plan operation may be collected from underlying reported system performance information (e.g., processor utilization, I/O utilization, network utilization, etc.). In some embodiments, performance information may be implemented as a timer or other counter to measure elapsed performance time for operation(s).

As indicated at 720, a scaling event for an operation may be detected, in some embodiments. Scaling events may differ for different types of operations. For example, a scan operation may be evaluated for a scaling event according to elapsed time, whereas a sort operation may be evaluated according to processor utilization. In some embodiments, criteria, thresholds, conditions, or other features of operation performance for detecting scaling events may be determined according to performance requirements for a query. For example, a Service Level Agreement (SLA) or other indication of expected performance (e.g., for 95% of queries (P95), X time for performing a query is expected. Such expectations may determine the criteria (e.g., the elapsed time threshold value).

As indicated at 730, a performance distribution of the operation among a modified number of processing resources may be determined according to the scaling event, in some embodiments. For example, a scaling factor (e.g., up or down) in terms of the number of processing resources may be determined in order to meet a performance expectation for the query (e.g., a time to perform the query, a number of resources to perform the query). Performance distributions may be determined according to the number of processing resources available to perform the operation (e.g., there may be a limit on containers, child processes or the speed at which an event-driven compute service can perform the operation). In some embodiments, resource limitations (e.g., based on cost of processing resources for a user account associated with the query) may limit, cap, or determine the number of processing resources that can be used to perform the operation.

Distribution of the operation may be determined according to the type of operation, in some embodiments. A scan or filter operation, for instance, may divide ranges of database data to be scanned between processing resources. A hash join operation, in another example, may divide up keys, records, or value to use to probe a hash join table. Some types of operations may be scaled at some (but not all) types of processing resources (e.g., some operations cannot be performed at a remote or external compute service like the event-driven compute service discussed above but can be performed by a child process). Performance distribution may also include instructions for merging, combining, or handling the modified distribution of the operation so that the output of the operation is not discernibly different than if no scaling operation were performed (e.g., all results may be returned to a successor operation in an expected format from an expected process or query engine).

As indicated at 740, the modified number of processing resources may be caused to continue performing the operation according to the determined performance distribution, in some embodiments. For example, as discussed above with regard to FIGS. 4 - 6, different processing resources and performance distributions can be accomplished using process manipulation, virtualization, or external computation services. An API may be invoked, in some embodiments, which may indicate type of processing resources and scaling factor (e.g., less or more resources), and/or other information to perform the operation (e.g., database metadata, access credentials, etc.). The results of the performance distribution may be merged and returned to a successor operation without modifying the expected format of the results, in some embodiments.

Figure 8:
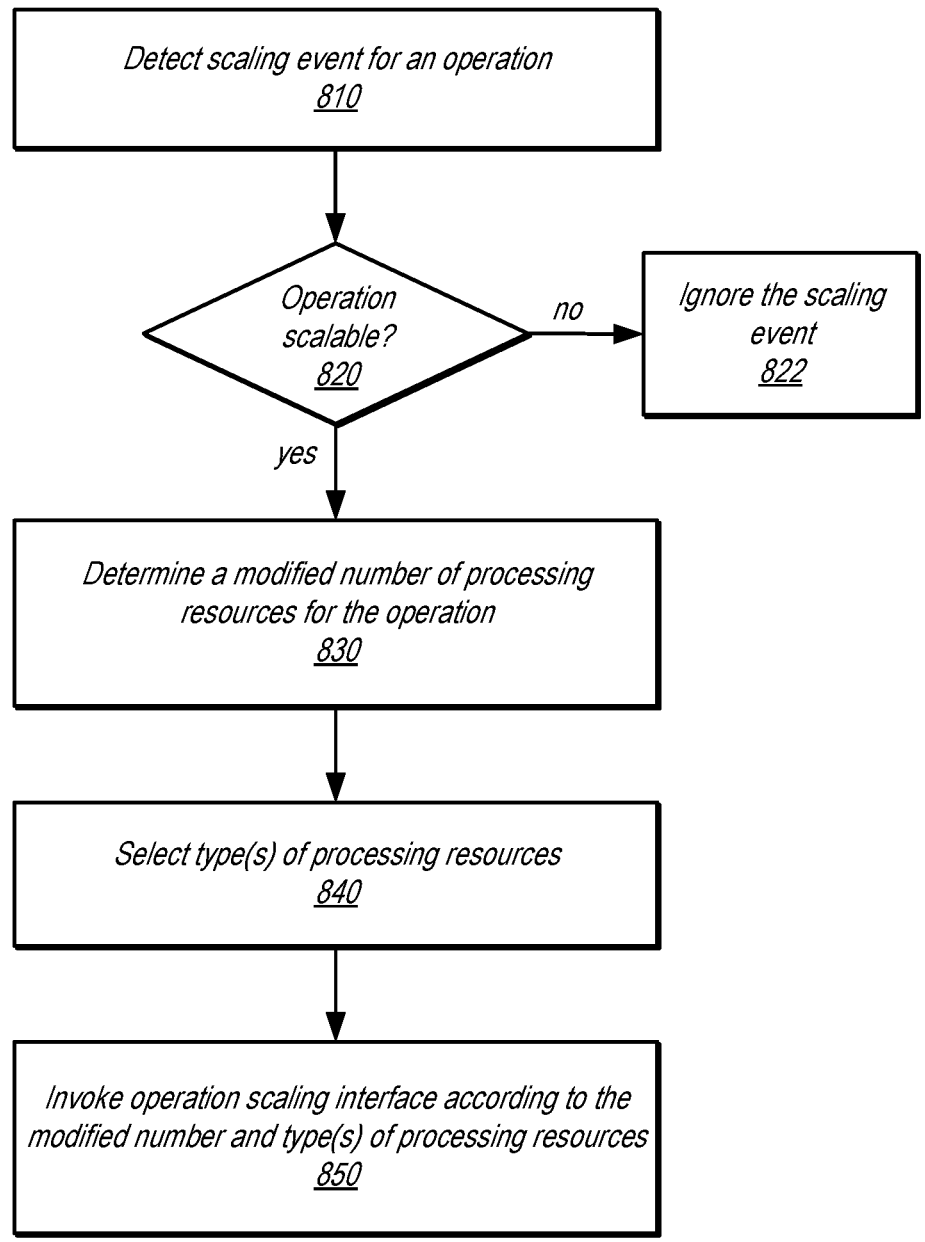
FIG. 8 is a high-level flowchart illustrating methods and techniques to implement invoking an operation scaling interface, according to some embodiments.

FIG. 8 is a high-level flowchart illustrating methods and techniques to implement invoking an operation scaling interface, according to some embodiments. As indicated at 810, a scaling event for an operation may be detected, in some embodiments, according to the various techniques discussed above. An evaluation of the detected scaling event may be made to determine whether the operation is scalable, as indicated at 820. For example, a list of scalable operation types (or non-scalable operation types) may be maintained and compared with the operation for which the scaling event is detected. In some embodiments, an operations location within the query plan may indicate whether it is scalable (e.g., root operations before returning a query result may not be scalable or other operations not identified be a "bottleneck" operation may not be scalable). If an operation is not scalable, then the scaling event may be ignored, as indicated at 822.

As indicated at 830, a modified number of processing resources may be determined for the operation, in some embodiments. For example, the modified number of processing resources may be determined based on an estimated number of processing resources ability to complete an operation within a threshold time (e.g., to meet an SLA or expected performance for the query). In some embodiments, the modified number of processing resources may be limited according to a cost limitation (or availability). As indicated at 840, type(s) of processing resource(s) 840 may be selected, in some embodiments. For example, some operations may be limited to certain resources (e.g., an event driven compute service may have a limited number of pre-configured functions that can be requested for operations). In some embodiments, the types of processing resource(s) may be selected according to performance characteristics (e.g., process manipulation may be preferred over virtualization manipulation or remote compute services as it may be faster to perform a given operation). In another example, if a virtual resource is available (e.g., already provisioned and ready from performing a previous operation) then it may be selected, otherwise another resource (e.g., a child process or event driven computing service) may be selected.

As indicated at 850, an operation scaling interface may be invoked according to the modified number and type(s) of processing resource(s), in some embodiments. For example, a scaling interface may include processing resource type field as well as a number of resources per type in order to trigger distribution of operation performance to the number and type of resources specified in the interface request.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
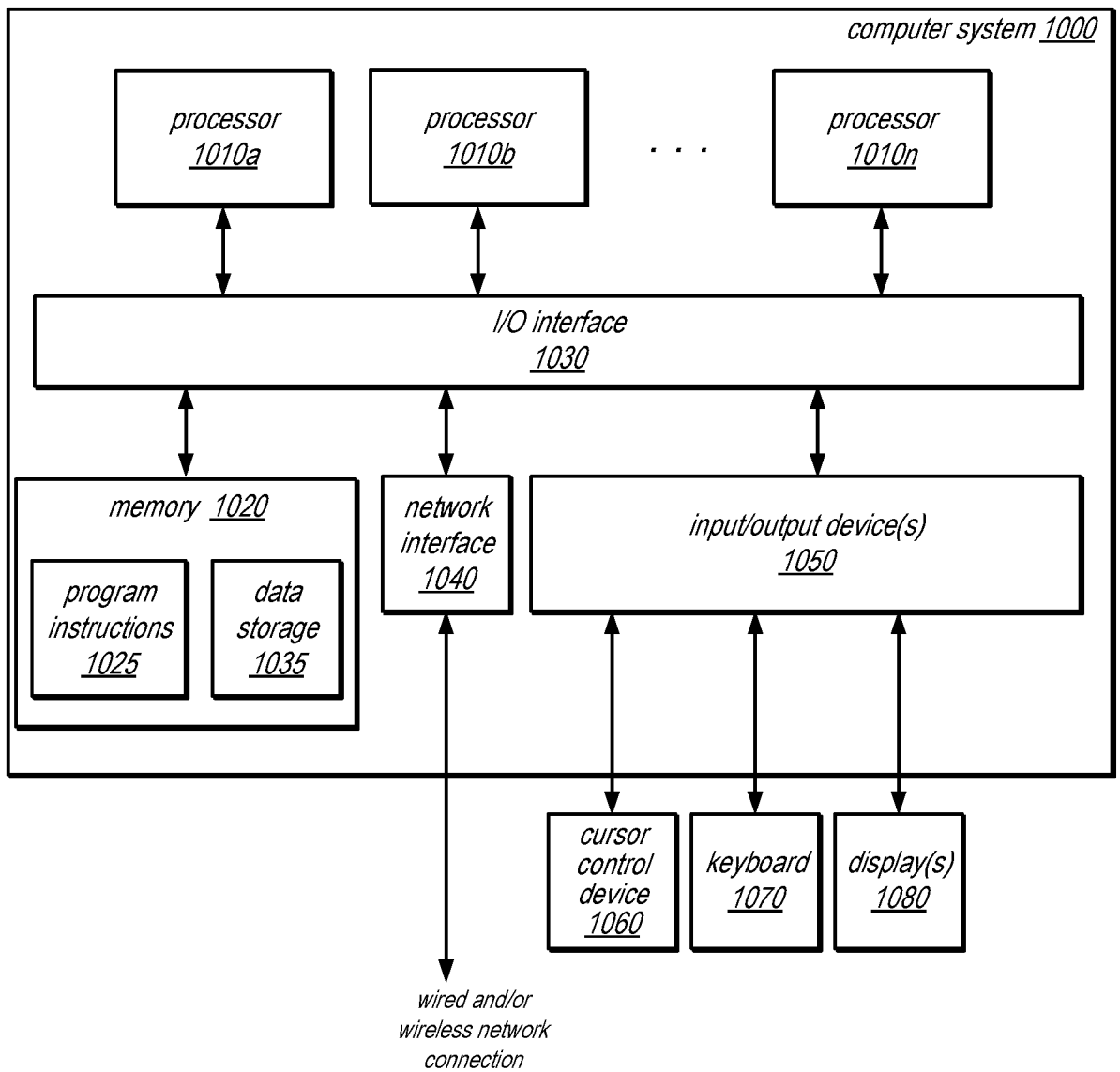
FIG. 9 illustrates an example system that implements the various methods, techniques, and systems described herein, according to some embodiments.

Embodiments of dynamically scaling query plan operations for query processing as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a query engine that performs queries to a database;
   the query engine, configured to:
      receive a query to the database;
      perform the query to the database, wherein to perform the query the query engine is configured to:
         monitor respective performance at one or more processing resources of individual operations of a plan generated by the query engine to perform the query;

based on the monitoring of the respective performance at the one or more processing resources of individual operations, detect a scaling event according to an evaluation of the respective performance of one of the individual operations, wherein the scaling event is detected independent of evaluating the respective performance of other ones of the individual operations of the plan;

determine a performance distribution of the operation among a modified number of processing resources according to the scaling event; and direct the modified number of processing resources to continue performing the operation according to the determined performance distribution.

2. The system of claim 1, wherein the modified number of processing resources is an increase in processing resources performing the operation.

3. The system of claim 1, wherein to direct the modified number of processing resources to continue performing the operation according to the determined performance distribution, the query engine is configured to initiate performance of the operation at one or more operating system virtualization containers.

4. The system of claim 1, wherein the query engine is implemented as part of a database service offered by a provider network, wherein the database is hosted as part of query engine for the provider network, and wherein the modified number of processing resources comprises virtualized hardware or a virtualized operating system offered by the provider network.

5. A method, comprising:
during performance of a query to a database:
monitoring respective performance of individual operations at one or more processing resources included in a plan to perform the query;

based on the monitoring of the respective performance of the individual operations at the one or more processing resources, detecting a scaling event according to an evaluation of the respective performance of one operation of the individual operations, wherein the scaling event is detected independent of evaluating the respective performance of other ones of the individual operations of the plan;

determining a performance distribution of the one operation among a modified number of processing resources according to the scaling event; and causing the modified number of processing resources to continue performing the one operation according to the determined performance distribution.

6. The method of claim 5, further comprising determining the modified number of processing resources according to a cost limitation for a user account associated with the query.

7. The method of claim 5, further comprising selecting a type of the modified number of processing resources according to a type of the one operation.

8. The method of claim 5, further comprising determining the modified number of processing resources in order to satisfy an expected performance of the query.

9. The method of claim 5, wherein causing the modified number of processing resources to continue performing the one operation according to the determined performance distribution comprises initiating performance of the one operation at one or more operating system virtualization containers.

10. The method of claim 5, wherein causing the modified number of processing resources to continue performing the one operation according to the determined performance distribution comprises requesting a compute service external to the query engine to perform the one operation.

11. The method of claim 5, further comprising:
before determining the performance distribution of the operation, determining that the one operation is scalable.

12. The method of claim 5, wherein the modified number of processing resources is a decrease in resources performing the one operation.

13. The method of claim 5, further comprising:
merging results generated by the performance of the one operation at the modified number of processing resources; and returning the merged results without modifying an expected format of the results for a successor operation.

14. One or more non-transitory, computer-readable storage media, storing program instructions that when executed on or across one or more computing devices cause the one or more computing devices to implement:
tracking performance of individual operations included in a plan to perform a query to a database;
for one of the individual operations:
evaluating performance of the operation at one or more processing resources;
based on the evaluating of the performance of the operation, detecting a scaling event for the operation, wherein the scaling event is detected independent of evaluating the respective performance of other ones of the individual operations of the plan;
determining a performance distribution of the operation among a modified number of processing resources according to the scaling event; and
causing the modified number of processing resources to continue performing the operation according to the distribution.

15. The one or more non-transitory, computer-readable storage media of claim 14, wherein, in causing the modified number of processing resources to continue performing the operation according to the determined performance distribution, the program instructions cause the one or more computing devices to implement creating one or more child processes to perform the operation at the query engine.

16. The one or more non-transitory, computer-readable storage media of claim 14, wherein the one or more non-transitory media comprise further program instructions that when executed cause the one or more computing devices to implement determining the modified number of processing resources in order to satisfy an expected performance of the query.

17. The one or more non-transitory, computer-readable storage media of claim 14, further comprising selecting a type of the modified number of processing resources according to an availability of the type of the modified number of processing resources.

18. The one or more non-transitory, computer-readable storage media of claim 14, wherein the modified number of processing resources is an increase in resources performing the operation.

19. The one or more non-transitory, computer-readable storage media of claim 14, wherein, in causing the modified number of processing resources to continue performing the operation according to the determined performance distribution, the program instructions cause the one or more computing devices to implement requesting a compute service external to the query engine to perform the operation.

20. The one or more non-transitory, computer-readable storage media of claim 19, wherein at least a portion of data for the database is stored in a storage service accessible to the compute service.

* * * * *